(12) United States Patent
Ohsumi

(10) Patent No.: US 6,816,214 B1
(45) Date of Patent: Nov. 9, 2004

(54) GUIDE PLATE, SURFACE LIGHT SOURCE DEVICE OF SIDE LIGHT TYPE AND LIQUID CRYSTAL DISPLAY

(75) Inventor: Kazumasa Ohsumi, Hatogaya (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 09/452,162

(22) Filed: Dec. 1, 1999

(30) Foreign Application Priority Data

Dec. 10, 1998 (JP) .......................................... 10-350809

(51) Int. Cl.$^7$ ......................................... G02F 1/1335
(52) U.S. Cl. ......................................... 349/65; 362/31
(58) Field of Search ............................ 349/65, 63, 62; 385/901; 362/31

(56) References Cited

U.S. PATENT DOCUMENTS

| | | | | |
|---|---|---|---|---|
| 5,396,350 A | * | 3/1995 | Beeson et al. ................. | 349/62 |
| 5,555,109 A | * | 9/1996 | Zimmerman et al. .......... | 349/57 |
| 5,671,994 A | * | 9/1997 | Tai et al. ....................... | 362/31 |
| 5,771,328 A | * | 6/1998 | Wortman et al. .............. | 385/146 |
| 6,088,074 A | * | 7/2000 | Suzuki .......................... | 349/62 |
| 6,124,906 A | * | 9/2000 | Kawada et al. ................ | 349/65 |
| 6,130,730 A | * | 10/2000 | Jannson et al. ................ | 349/65 |
| 6,147,725 A | * | 11/2000 | Yuuki et al. ................... | 349/65 |
| 6,330,386 B1 | * | 12/2001 | Wagner et al. ................ | 385/120 |

FOREIGN PATENT DOCUMENTS

| | | |
|---|---|---|
| JP | 10-142601 | 5/1998 |
| TW | 278142 | 6/1992 |
| WO | WO 9827382 A1 * | 6/1998 ............. F21V/8/00 |

OTHER PUBLICATIONS

Copy of Office Action issued Jun. 6, 2001 by Patent Office of Republic China.

* cited by examiner

*Primary Examiner*—Kenneth Parker
*Assistant Examiner*—David Chung
(74) *Attorney, Agent, or Firm*—Staas & Halsey LLP

(57) ABSTRACT

A liquid crystal display includes a surface light source device of a side light type for lighting. On lighting a fluorescent lamp, primary light is introduced into a guide plate and propagates within the guide plate. Much of the illumination light enters into any one of a number of ridges on an emission-function face, being followed by inner impingement upon a flank face, which is more remote from an incidence end face, at an entry angle greater than a critical angle θ 1. Much of the light which has undergone such inner impingement is supplied to a liquid crystal display panel almost frontward via a top face. The ridges are inclined at a predetermined inclination angle α with respect to the incidence end face of the guide plate. Inclination angle α preferably falls within a range from 5 degrees to 45 degrees, in particular, from 15 degrees to 30 degrees. Employment of size-reduced ridges is realizable, leading to less conspicuous ridges without reducing emission function. Moire fringes are preventable, too. Each ridge may be provided with all or some of a tapered shape, an inclined flank face and foot portions with a stepwise difference.

34 Claims, 10 Drawing Sheets

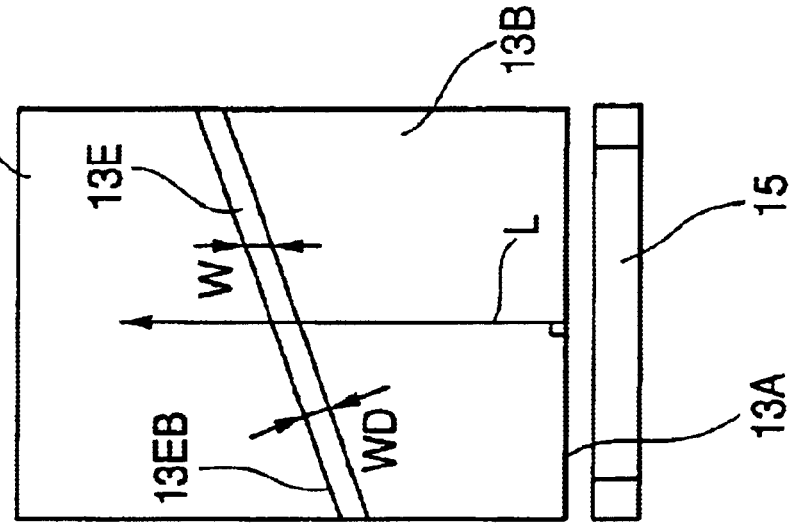
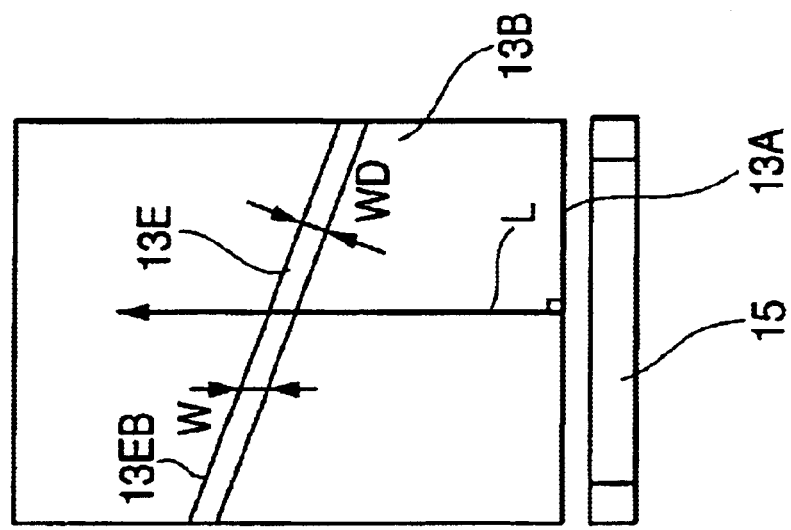
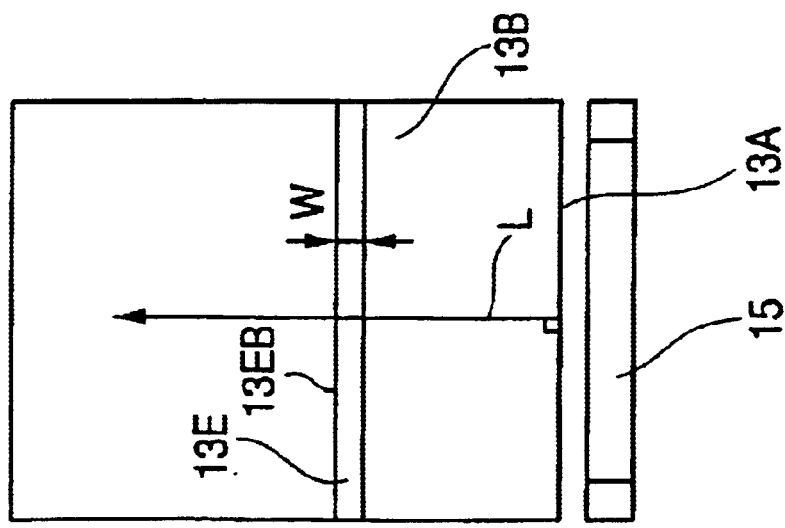

SURFACE LIGHT SOURCE
DEVICE OF SIDE LIGHT
TYPE

11: LCD PANEL

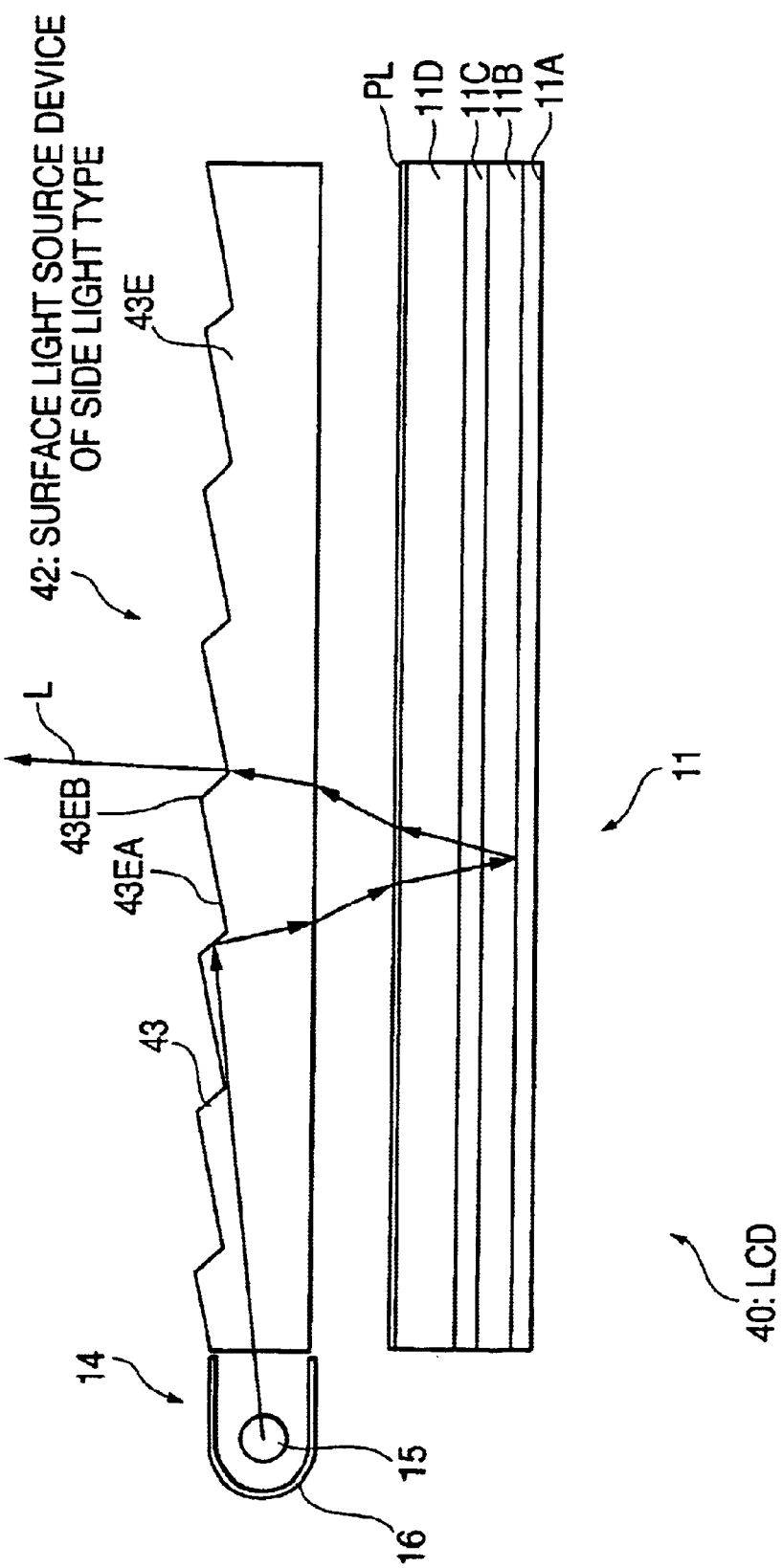

GUIDE PLATE, SURFACE LIGHT SOURCE DEVICE OF SIDE LIGHT TYPE AND LIQUID CRYSTAL DISPLAY

BACKGROUND

1. Field of Invention

The present invention relates to a guide plate, surface light source device of side light type and liquid crystal display, in particular, to an improved guide plate, surface light source device of side light type employing the improved guide plate and liquid crystal display employing the surface light source device for illuminating a liquid crystal display panel.

2. Related Art

Known liquid crystal displays belong either to a kind employing a transmission-type liquid crystal display panel or to another kind employing a reflection-type liquid crystal display panel. In general, the former hardly permits ambient light to be used for image formation, leading to employment of surface light source devices such as those of side light type for back-lighting of the transmission-type liquid crystal display panel.

On the contrary, the latter enables ambient light to be used for image formation, leading to saving of electric power consumption. However, a device for illuminating a reflection-type liquid crystal display panel is still required under conditions of little ambient light, for example, at night. So-called surface light source devices of side light type are suitable for such a use. That is due to side-by-side arrangement such that a primary light source is disposed beside a guide plate to bring only a slight increase of thickness to a liquid crystal display.

Illumination light is supplied to a reflection-type liquid crystal display panel usually from the front side in the same way as ambient light. It is, however, known to have a reflection-type liquid crystal display panel function temporally as a transmission-type liquid crystal display panel. That case allows back-lighting of the liquid crystal display panel to be employed.

Liquid crystal displays employing a front-lighting arrangement are known as disclosed in Japanese Patent Laid-Open Heisei (Tokkai-Hei) 10-142601. FIG. 12 is a cross section view to illustrate an out-lined structure of the disclosed display.

Referring to FIG. 12, a surface light source device of side light type 1 is disposed for front-lighting of a reflection-type liquid crystal display panel 2. The surface light source device 1 comprises a guide plate 3 and a primary light source 4 disposed beside the guide plate. The guide plate 3 is arranged at the display screen side of the reflection-type liquid crystal display panel 2. The primary light source 4 is composed of, for instance, a fluorescent lamp 5 and a reflector 6 partially enclosing the lamp. The guide plate 3 has an end face to provide an incidence end face 3A which is supplied with illumination light L from the fluorescent lamp 5 through an opening of the reflector 6.

The guide plate 3 is a plate-like member made of a transparent material such as acrylic resin (PMMA resin), which may be produced through an injection molding technique.

The guide plate 3 has major faces to provide an inner face 3B and an outer face 3C which is opposite with the inner face. The inner face 3B faces the liquid crystal display panel 2.

Illumination light L is introduced into the guide plate 3 and propagates within the guide plate to distance itself from the incidence end face 3A with repeated inside reflections at the inner face 3B and outer face 3C. In this process, emission occurs little by little from the inner face 3B and outer face 3C. Emission from the inner face 3B is supplied to the liquid crystal display panel 2, contributing to image formation in a well-known manner.

The inner face 3B is provided with a large number of ridges 3E to promote emission from the inner face 3B. It is noted that "ridge" is defined as a "projection extending with a small width". The ridges 3E extend in parallel with the incidence end face 3A (i.e., vertical to the drawing paper face).

As shown in a partial enlarged illustration with reference symbol A, each ridge 3E has a pair of steep flank faces (side faces) 3F, which are angled almost vertical to the inner face 3B, and a top face 3G which is angled almost parallel to the inner face 3B. Some of the illumination light L which has entered into individual ridges 3E is emitted from the flank faces 3F or top face 3G. Needless to say, refraction occurs at every emission according to Snell's Law.

Thus emitted light impinges directly or indirectly onto the liquid crystal display panel 2. In other words, the inner face 3B provides an "emission function face" for the liquid crystal display panel 2 and the emission function face outputs light which is inputted to the liquid crystal display panel 2. As for ambient light, it is introduced into the guide plate 3 through the outer face 3C, and then is inputted to the liquid crystal display panel 2 through the emission function face 3B.

Such light (illumination light or ambient light) inputted to the liquid crystal display panel 2 is modified, being emitted from the outer face 3C to contribute to display operation after transmitting through the guide plate 3.

However, the above-described prior art is subject to a serious problem. That is, many ridges 3E are conspicuous on viewing the guide plate 3 from above the outer face 3C, thereby inevitably reducing illumination quality and accordingly giving reduced display quality to a liquid crystal display.

It is needless to say that such conspicuousness could be eliminated by removing the ridges 3E to make the inner face 3B flat. However, such a flat inner face would not work well as an emission function face when the fluorescent lamp 5 is lighted. That is due to a well-known fact that illumination light introduced sideways into the guide plate 3 is hardly able to escape through such a flat inner face.

According to another technique which seems to be applicable, the problem is solved by giving a much reduced size (in particular, width) to the ridges 3E. However, such size reduction results in reduced emission function, leading to difficulty in providing bright illumination and display.

SUMMARY OF THE INVENTION

The present invention has been proposed in light of the above-described background.

An object of the present invention is to improve the above prior art guide plate by providing a guide plate with ridges which are less conspicuous without deteriorating emission function.

An object of the present invention is to provide a surface light source device of side light type which employs the improved guide plate to give bright and high quality illumination output.

Still another object of the present invention is to provide a liquid crystal display which employs the improved surface light source device of side light type for lighting, in particular, for front-lighting of a liquid crystal display panel to realize a bright and high quality display.

In the first place, the present invention is applied to a guide plate comprising an incidence end face to introduce illumination light and an emission function face provided with the function of emitting illumination light. The emission function face is provided with a large number of ridges, each of which has a first flank face directed to the incidence end face and a second flank face opposite to the first flank face.

And, each of the ridges extends in a direction which is inclined at an angle falling within a predetermined angle range with respect to the incidence end face. The angle range is preferably from 5 degrees to 45 degrees, in particular, from 15 degrees to 30 degrees.

The ridges extending obliquely work on light approaching from directions of the incidence end face, as they have enlarged width in comparison with conventional ridges extending in parallel with the incidence end face. Accordingly, if the size of each ridge is reduced, less reduction in emission function will be caused as compared with the prior art. As described previously, the smaller the size of each ridge is, the less conspicuous it is. After all, the present invention enables less conspicuous ridges (small size ridges) and less reduced emission function.

Preferably, in the first and second flank faces, at least the latter is inclined so that a distance from the incidence end face increases approaching each ridge top portion. It is more preferable that both of the first and second flank faces are inclined so that a distance from the incidence end face increases approaching each ridge top portion.

Such embodiments help illumination light which has entered into each ridge to undergo inside-reflection at the second flank face. As a result, directivity of emission from the emission function face is improved. In other words, emission from the emission function face is more apt to be directed around frontward with respect to the emission function face.

Each ridge projects from a "general plane" of the emission face. Accordingly, the first and second flank faces connect with the emission function face at a pair of foot portions for each ridge. It is noted that "general plane (of an emission face)" is defined as a plane which represents an emission face and intersects with an incidence end face to provide one edge of the incidence end face.

According to a preferable embodiment employing the featured foot portions, the second foot portion provides a stepwise difference such that a thickness of the guide plate is greater at the second foot portion than at the first foot portion.

Due to such a stepwise difference between the foot portions, propagation directions of illumination light which is able to enter into each ridge is limited so as to have a large inside-incidence angle with respect to the second flank face. As a result, emission is more apt to be preferentially directed roughly frontward with respect to the emission function face.

The present invention is applied to a surface light source device of side light type which comprises a guide plate having an incidence end face to introduce illumination light and an emission function face provided with a function to emit illumination light, and which further comprises a primary light source disposed beside the guide plate to supply illumination light. The surface light source device employs the guide plate to which improvements are applied in various manners as above, thereby enabling bright and high-quality illumination output to be realized.

The present invention is further applied to a liquid crystal display which employs the above improved surface light source device of the side light type for illuminating a liquid crystal display panel to realize a bright and high-quality display. In particular, it is preferable to adopt the above improved surface light source device of side light type in a front-lighting arrangement for the liquid crystal display panel.

The above-described and the other features will be understood more in detail through the description below with reference to the accompanying drawings. It is noted that the drawings include illustrations with some exaggeration in size or shape for the sake of easy understanding.

BRIEF DESCRIPTION OF DRAWINGS

FIGS. 5a, 5b and 5c are plan views illustrating operations of obliquely extending ridges, FIG. 5a showing prior art, FIGS. 5b and 5c showing cases in accordance with the present invention;

FIG. 11 is an exploded perspective view of a liquid crystal display of a fourth embodiment in accordance with the present invention;

DESCRIPTION OF THE EMBODIMENTS

<1> First Embodiment

Figure 1A:
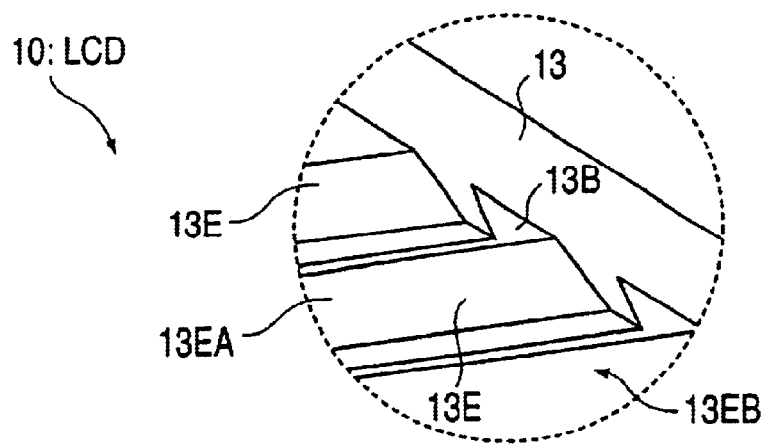
FIG. 1A is an enlarged view of portion C shown in phantom lines in FIG. 1.
Figure 1:
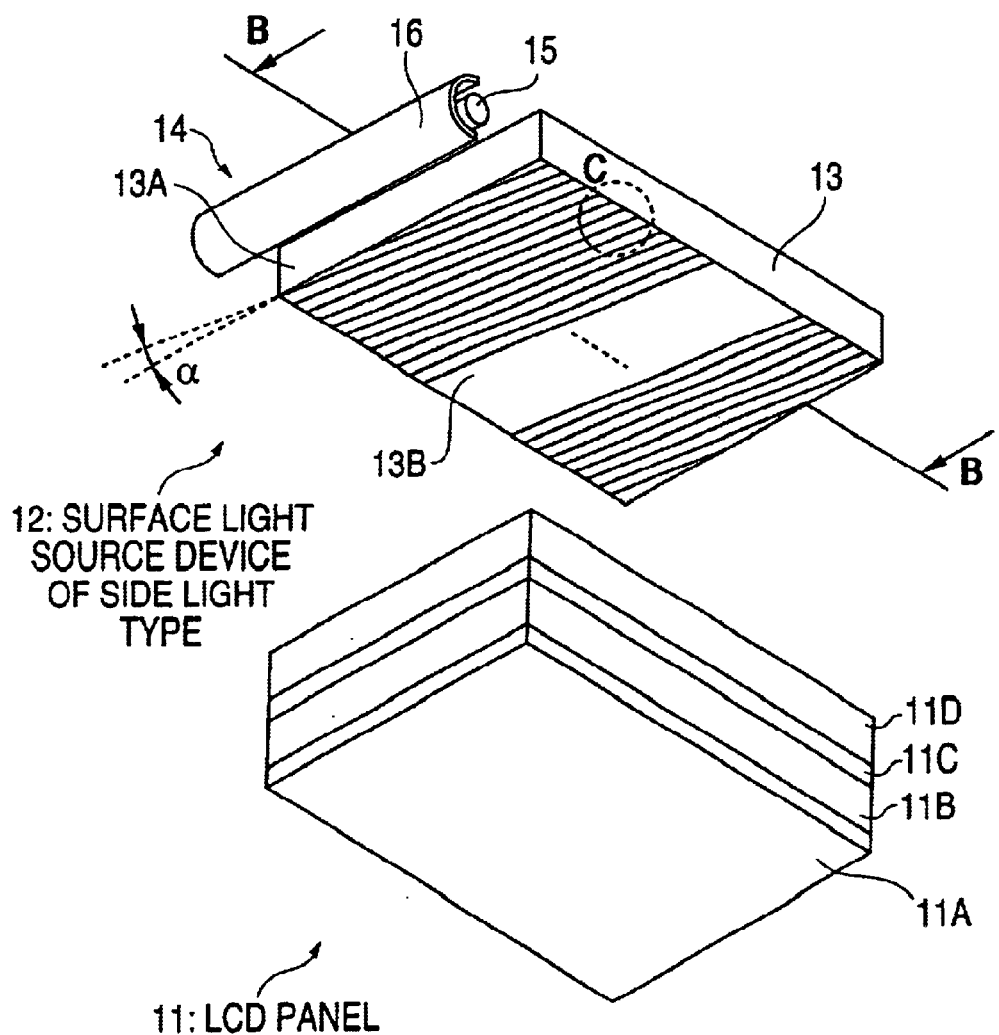
FIG. 1 is an exploded perspective view from the bottom of a liquid crystal display of a first embodiment in accordance with the present invention.
Figure 2A:
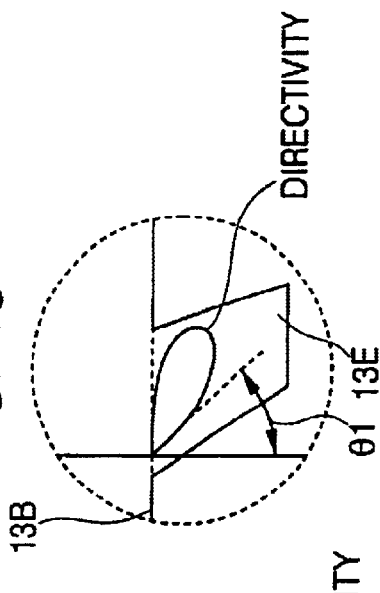
FIG. 2A is an enlarged view of portion D shown in phantom lines in FIG. 2.
Figure 2B:
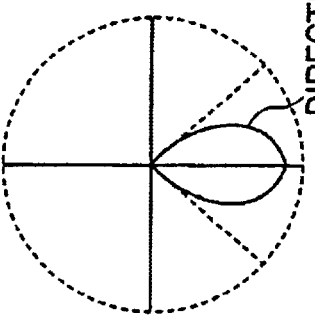
FIG. 2B is an enlarged view of F shown in FIG. 2A.
Figure 2C:
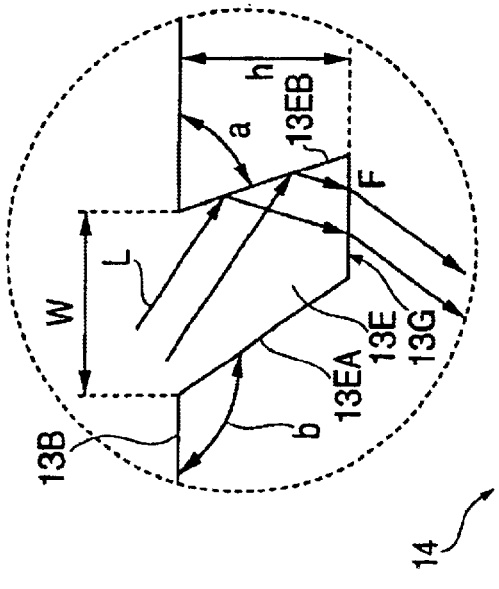
FIG. 2C is an enlarged view of portion E shown in phantom lines in FIG. 2.
Figure 2:
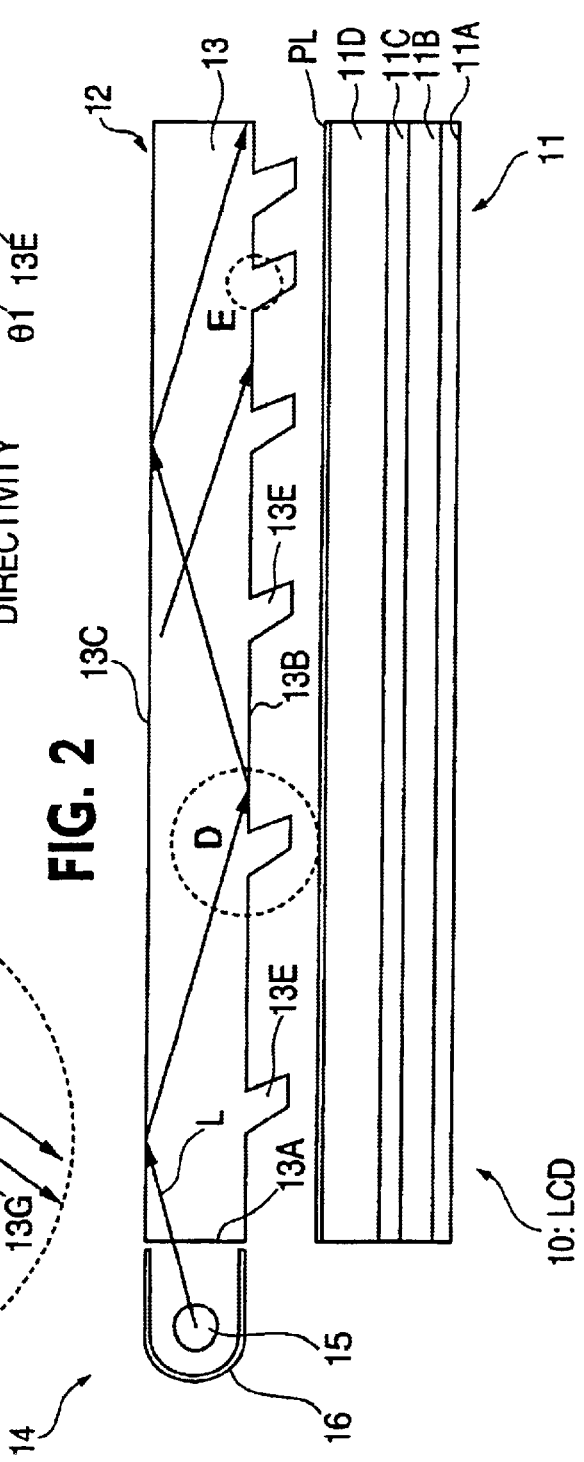
FIG. 2 is a cross section view along line B—B in FIG. 1.

Referring to FIGS. 1 and 2, a liquid crystal display 10 comprises a liquid crystal display panel 11 of reflection type and a surface light source device of side light type 12. The surface light source device 12 is disposed at the outside of the liquid crystal display panel 11 (i.e., at the display screen's side or viewing side) for front-lighting.

The liquid crystal display panel 11 is structured and operates in a well-known manner. That is, the liquid crystal display panel 11 comprises a reflection plate 11A, glass substrate 11B, liquid crystal layer 11C, glass substrate 11D and polarization plate PL which are laminatedly arranged. The glass substrate 11B and glass substrate 11D are provided with matrix-like transparent electrodes (not shown), respectively. The transparent electrodes are driven by a driving circuit (not shown) to control a polarization state of light which transmits through the liquid crystal layer 11C. Accordingly, output light of the liquid crystal display panel forms an image.

The surface light source device 12 comprises a guide plate 13 and a primary light source 14. The guide plate 3 has an end face to provide an incidence end face through which the plate is supplied with illumination light from the primary light source 14. The primary light source 14 is composed of, for example, a fluorescent lamp 15 and a reflector 16 backing the lamp. Illumination light is directed to the incidence end face 13A through an opening of the reflector 16. The guide plate 13 introduces illumination light forming a beam flux which has some angular extent. For the sake of explanation, the flux is represented by "illumination light L" as shown in FIG. 2.

The guide plate 13 is a plate-like member made of a transparent material such as acrylic resin (PMMA resin), which can be produced through application of injection molding techniques. As shown in the enlarged view of FIG. 1A, the guide plate 13 has major faces to provide an inner face 13B and an outer face 13C which is opposite with the inner face. The inner face 13B faces and is adjacent to the liquid crystal display panel 11.

The inner face 13B has a large number of ridges to provide an emission function face which is capable of promoting emission. It is noted again that "ridge" is defined as a "projection extending with a small width".

The ridges 13E are substantially not parallel with respect to the incidence end face 13A, being inclined at a certain inclination angle α. Inclination angle α is determined according to design, preferably falling in a range from 5 to 45 degrees, in particular, from 15 to 30 degrees.

Such an inclination arrangement increases illumination light which approaches obliquely each ridge in comparison with the parallel arrangement of the prior art. This is further explained with reference to FIGS. 5a to 5c.

In FIG. 5a (prior art), each ridge 13E has an effective width W that is equal to an actual width (i.e., distance vertically traversing each ridge) WD. It is noted that the "effective width W" is "effective" width of each ridge 13E as viewed from the standpoint of light which is supplied from the lamp 15. In general, there is a relation, W=WD/cos α.

On the contrary, ridges 13 E obliquely arranged as shown in FIGS. 5b and 5c function so that each of them has an effective width W that is greater than an actual width WD. In other words, if such ridges having WD smaller than the prior art are employed, the effective width W can be maintained. It is needless to say that ridges of small-size are hardly conspicuous and accordingly they prevent illumination quality of the surface light source device 12 and display quality of the liquid crystal display 13 from being deteriorated.

From another standpoint, the obliquely arranged ridges 13E reduce probability of Moire fringes appearing, which could result from other periodically arranged elements such as transparent electrodes. This also prevents the illumination quality or display quality from being deteriorated. The technical meaning of the above numerical range of angle α is as follows.

First, if angle α is smaller than 5 degrees, the above described effect is hardly expected in practice. If angle α exceeds 15 degrees, the above described effect becomes quite tangible. However, if angle α is too great, for instance, exceeding 45 degrees, inside-incidence angles in the ridges become large although the effective width W becomes very great, with the result that emission efficiency falls and light supply direction to the liquid crystal display panel 11 tends to be much inclined. This tendency becomes progressively tangible when the angle α exceeds 30 degrees. Taking account of this, a practical range of angle α is from 5 to 42 degrees and, in particular, angle α preferably falls within a range 15 to 30 degrees.

The ridges 13E employed in the present embodiment are shaped so that the following conditions are satisfied (cf: partially enlarged illustration of D in FIG. 2A).

(1) Every ridge 13E has generally one three-dimensional shape.

(2) The extent of "cross section in parallel with an outer face 13C" decreases from a foot portion toward a top portion for each ridge.

(3) First and second flank faces 13EA and 13EB are inclined so that a distance from the incidence end face 13A increases from a foot portion toward a top portion for each ridge. This inclination is represented by angles a and b of the flank faces 13EB, 13EA with respect to a general plane of the emission face (the inner face 13B in the present embodiment). Accordingly, there is a relation, a <90 degrees and b >90 degrees.

This general plane and the incidence end face 13A provide an intersection which is one edge (a lower edge in FIG. 2) of the incidence end face 13A. Thus each ridge is inclined as a whole so that a distance from the incidence end face 13A increases from a foot portion toward a top portion.

On lighting of the fluorescent lamp 15, illumination light L is introduced into the guide plate 13 and then propagates within the guide plate 13 so as to move far from the incidence end face 13A with repeated inside-reflections at the inner and outer faces 13B and 13C.

Through this process, much of the illumination light L has the opportunity to enter into any of the ridges 13E. In general, entering into a ridge 13E succeeds to an inside-reflection at the outer face 13C. Therefore, as shown in the partially enlarged illustration in FIG. 2C, light which enters into a ridge 13E has an oblique directivity that is related to a critical angle θ 1 (see dotted line). For example, critical angle θ 1 is 42. 39 degrees if the guide plate 13 is made of acrylic resin (refractive index: 1.49) which is a typical material.

Accordingly, inside-reflections at the outer face 13C are mostly total reflections. As a result, light which enters into a ridge 13E has entering angles greater than critical angle θ

1. And the entering angles do not exceed 90 degrees because the entering light is a part of the inside propagation light.

It is noted that "entering angle" is expressed with reference to a normal plane with respect to a general plane of the emission function face (the inner face 13B) in the same manner as in the case of critical angle θ 1.

Illumination light which has entered into each ridge 13E is subject to inside-incidence to the second flank face 13EB. Incidence angle at this inside-incidence is fairly large due to the aforesaid condition (3). As a result, inside-incidence light is mostly inner-reflected by the flank face 13EB and followed by inside-incidence to a top face 13G.

Incidence angle at this inside-incidence is small, in other words, nearly vertical incidence. Therefore, emission through the top face 13G occurs easily (see partially enlarged illustration of D in FIG. 2A). This emission has directivity which is facing the liquid crystal display panel 11 almost at a right angle as shown in the partially enlarged illustration of F in FIG. 2B.

Figure 12A:
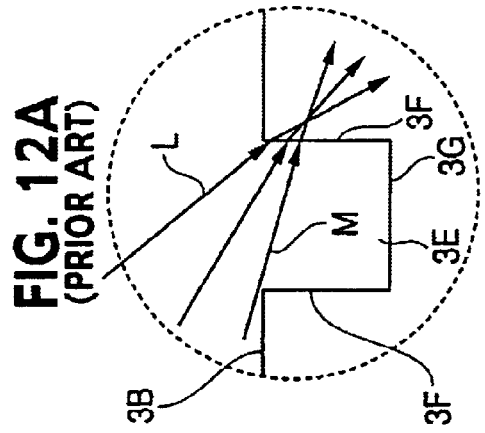
FIG. 12A is an enlarged view of portion A shown in phantom in FIG. 12.
Figure 12:
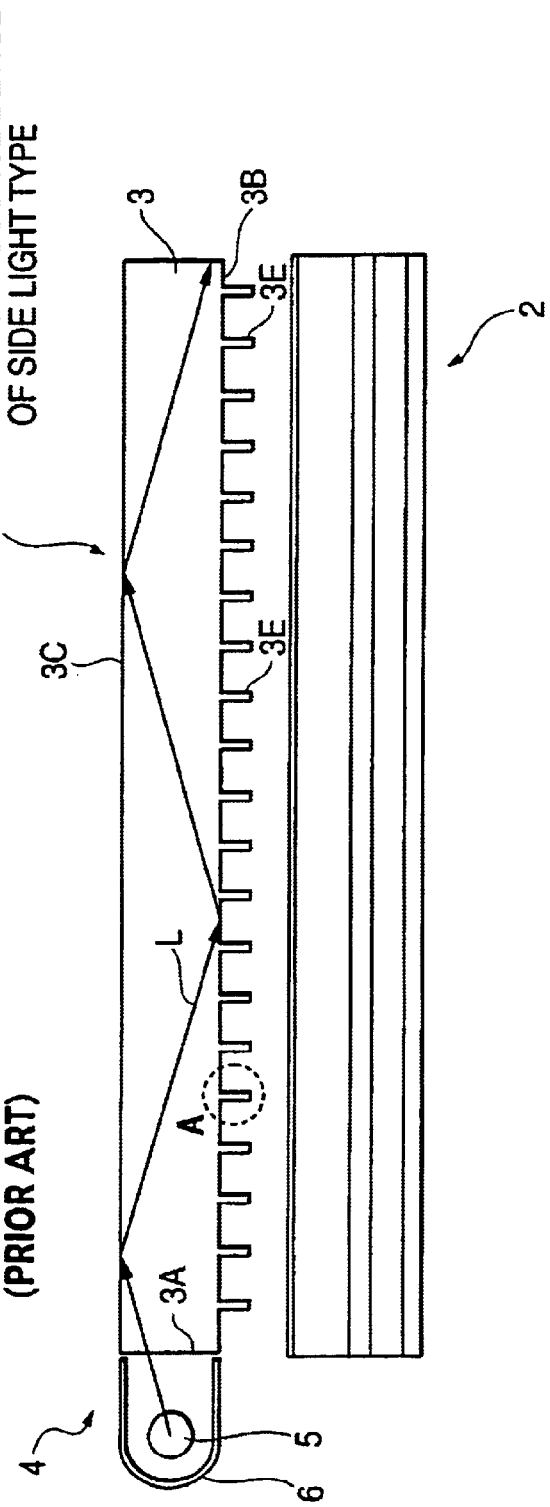
FIG. 12 is a cross section view of a liquid crystal display to which a conventional surface light source device of the side light type is applied in a front-lighting arrangement.

If the second flank face 3F is steep vertically (without inclination) as shown in partially enlarged illustration A in FIG. 12, emission through the flank face 3F increases, with the result that the liquid crystal display panel 11 is supplied with light from greatly inclined directions (see beam M and its path in FIG. 12). The present embodiment avoids this and realizes promoted light supply from around a frontal direction (approximately, within 30 degrees with respect to the frontal direction).

In general, directivity of light entering into a ridge 13E varies to some extent depending on conditions such as thickness of the guide plate 13 or relation between the incidence end face 13A and the primary light source 14. Accordingly, inclination angle a of the second flank face 13EB is preferably set at a designed angle within a range, 45 degrees <a <90 degrees, in particular, 60 degrees <a <80 degrees under consideration of the conditions. This angle setting is designed so that entering light is well subject to total reflection at the flank face 13EB and impinges to the liquid crystal display panel 11 at a small incidence angle through the top face 13G.

On the other hand, for inclination angle b of the first flank face 13EA, care is taken so that inner incident light to the flank face 13B is not shielded. Care is also taken not to make "mold release" difficult in molding of the guide plate 13. Concretely saying, angle b falls preferably within a range from "90 degrees+critical angle θ 1" to "180 degrees-angle α".

The height of reach ridge 13E is preferably about 20 μm, and the ratio of h to width (actual width) WD falls preferably within a range from 0.5 to 1.0. It is noted that indication of W in FIG. 2 is "effective width".

In the present embodiment, spaces between the ridges 13E decreases with distance from the incidence end face 13A. This is employed in order to prevent inner propagation light, which weakens with a distance from the incidence end face 13A, from bringing a limited light supply to the liquid crystal display panel 11 according to the aforesaid distance. In other words, it is intended to make uniform output light intensity distribution of the surface light source device 11.

The present embodiment employs a front-lighting arrangement. Accordingly, it is needless to say that the liquid crystal display 10 is capable of performing display operations, if put under plenty of ambient light, without lighting the fluorescent lamp 15. In general, ambient light can be introduced into the guide plate 13 through the outer face 13C regardless of the on/off state of the fluorescent lamp 15.

The principle on which ambient light contributes to display operation is generally the same as that of the prior art. Ambient light is supplied to the liquid crystal display panel 11 from the inner face 13B (including the ridges 13E) of the guide plate 13 to contribute to display operation according to a well known principle. That is, ambient light takes a route such as ambiance→guide plate 13→polarizer PL→glass substrate 11D→liquid crystal layer 11C→glass substrate 11B→reflection plate 11A→glass substrate 11B→liquid crystal layer 11C→glass substrate 11D→polarizer PL→guide plate 13→ambiance.

As well known, the quantity of light that is finally outputted to ambiance after travelling such a go-and-comeback route is controlled depending on a voltage applied to matrix-like transparent electrodes (not shown) formed on the substrates 11B and 11C. The output light of the liquid crystal display panel 11 forms the image.

The present embodiment illustrates behavior of ambient light. That is, the ridges 13E can avoid looking whitish and hazy since the ridges 13E are formed to project obliquely. This is explained below with reference to FIGS. 3 and 4.

Figure 3:
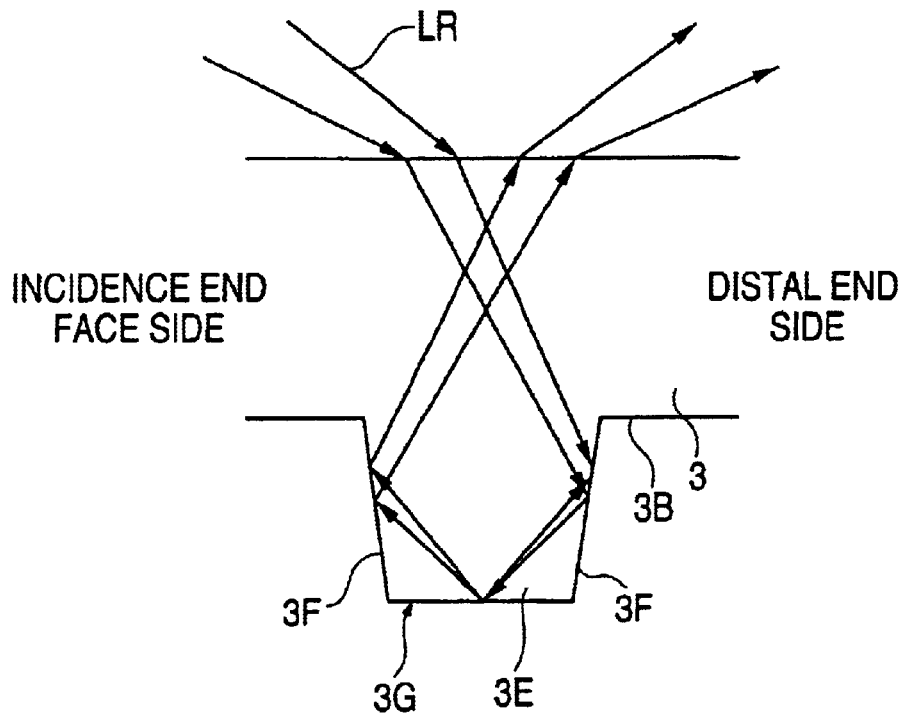
FIG. 3 is a cross section view illustrating light paths of ambient light in a case where ridges have flank faces approximately vertical to a general face of an emission function face.
Figure 4:
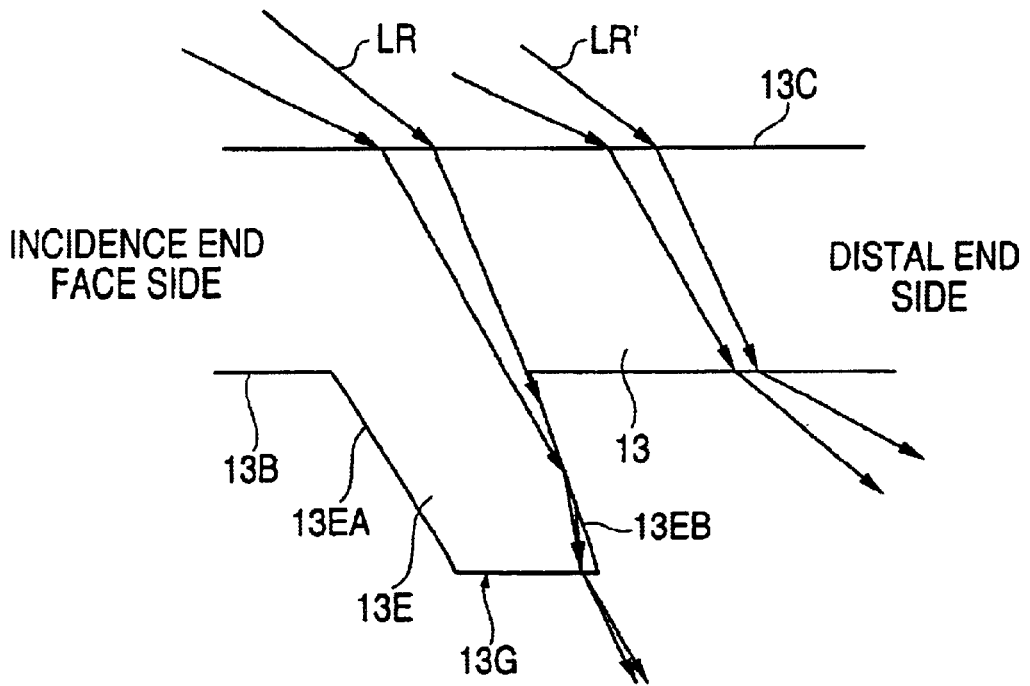
FIG. 4 is a cross section view illustrating light paths of ambient light, in a manner similar to FIG. 3, in a case where ridges have flank faces obliquely (i.e., not vertical) to a general face of an emission function face.

FIG. 3 shows light paths of oblique ambient light LR in a case where ridges 3E of a vertically projecting type are employed while FIG. 4 shows light paths of oblique ambient light LR in a case of the present embodiment employing ridges 13E of obliquely projecting type. As illustrated in FIGS. 3 and 4, oblique ambient light LR is refracted so as to approach a direction of guide plate thickness upon entering the guide plates.

As a result, in both cases of FIGS. 3 and 4, oblique ambient light LR positively tends to be subject to inner impinging onto the flank face 13F or 13EB at an angle greater than the critical angle. Ambient light totally reflected at the flank face 3F or 13EB is subject to inner impinging onto the top face 3G or 13G.

It is important that the inside-incidence angle to the top face 3G in FIG. 3 is greater than the inside-incidence angle to the top face 13G in FIG. 4. Accordingly, the former involves a significant amount of light which is emitted to ambiance after undergoing total reflection at another flank face 3F again and penetrating the guide plate 13 as shown in FIG. 3. Needless to say, such emitted light is not desirable because it gives a whitish and hazy background to the display screen without contribution to the display operation.

On the contrary, the latter involves plenty of light supplied to the liquid crystal display panel 11 (see FIG. 2) because inside-incidence to the top face 13G occurs at nearly vertical angles as shown in FIG. 4. Ambient light LR' which is subject to inside-incidence to the inner face 13B so as to avoid the ridges 13E moves toward the liquid crystal display panel 11 too as illustrated. Therefore, a little light is emitted to ambiance without contribution to the display, hardly producing whitish and hazy background.

<2> Second Embodiment

Figure 6A:
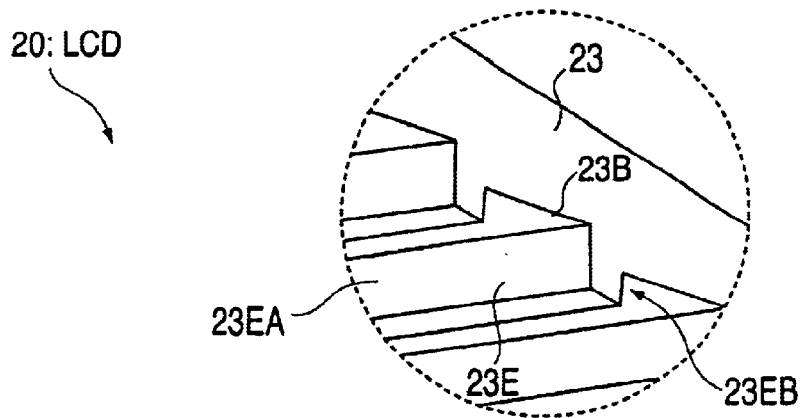
FIG. 6A is an enlarged view of portion H shown in phantom lines in FIG. 6.
Figure 6:
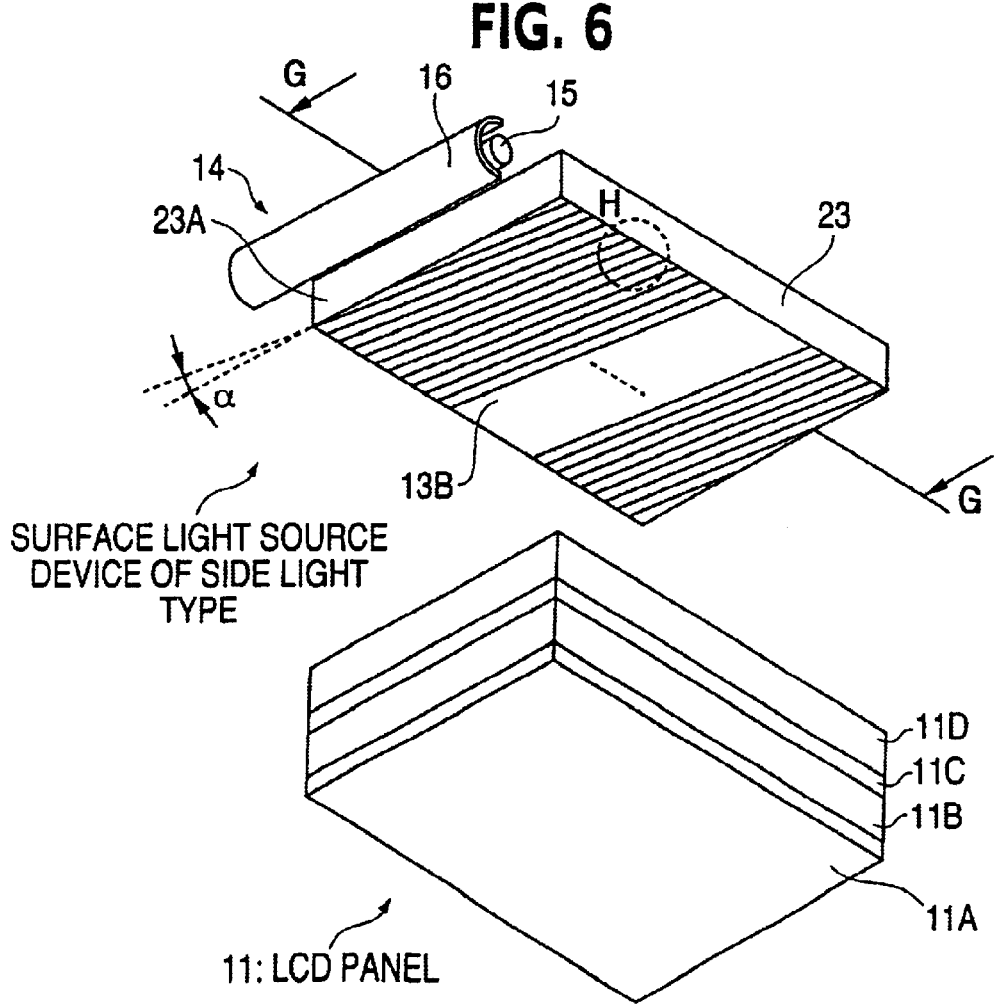
FIG. 6 is an, exploded perspective view of a liquid crystal display of a second embodiment in accordance with the present invention.
Figure 7:
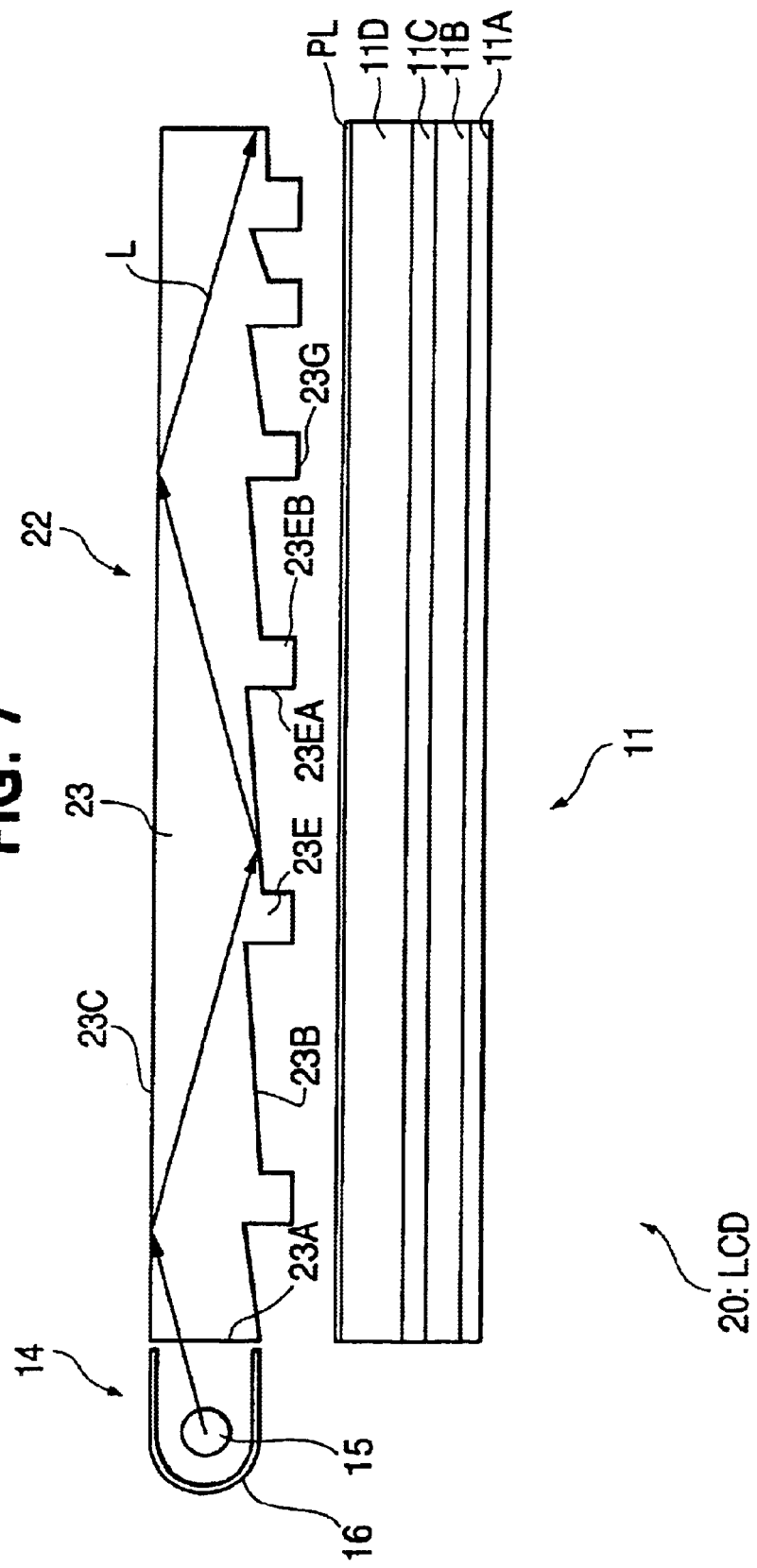
FIG. 7 is a cross section view along line G—G in FIG. 6.
Figure 9:
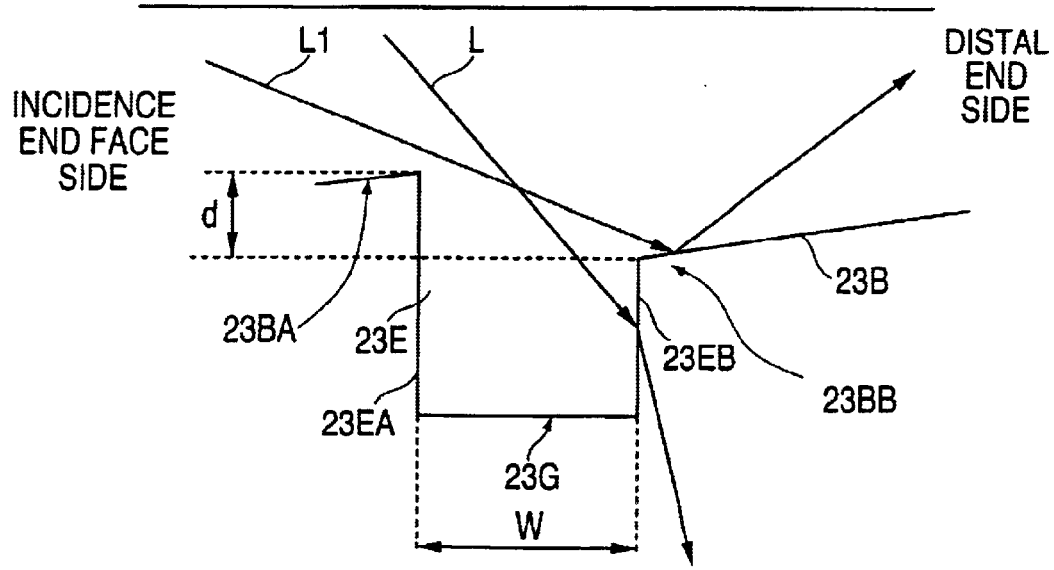
FIG. 9 is a cross section view illustrating light paths of illumination light in a case of ridges shown in FIG. 7.

FIGS. 6 and 7 give an exploded perspective view of a liquid crystal display 20 according to a second embodiment. FIG. 9 illustrates light paths of illumination light in the present embodiment. Hereafter, members common to the first embodiment are referenced with a simplified description.

Referring in the first place to FIGS. 6 and 7, the liquid crystal display 20 comprises a reflection-type liquid crystal display panel 11 and a surface light source device of a side light type 22. The surface light source device 22 is disposed at the outside (i.e., at the screen side or viewing side) of the liquid crystal display panel 11 for front-lighting of the panel. The liquid crystal display panel 11 is structured and works as described in the description of the first embodiment.

The surface light source device 22 comprises a guide plate 23 and a primary light source 14. The guide plate 23 has an end face to provide an incidence end face 23A through which the guide plate 23 is supplied with illumination light from the primary light source 14. The primary light source 14 may be the same as employed in the first embodiment. Illumination light is directed to the incidence end face 23A through an opening of a reflector 16.

Illumination light is introduced into the guide plate 23 in the form of a beam flux having some angular extent. For the sake of explanation, the flux is represented by "illumination light L" as shown in FIG. 7. The guide plate 23 may be made of the same material as that of the guide plate 13 employed in the first embodiment. Injection molding may be applied for manufacturing.

As shown in FIG. 6A particularly, guide plate 23 has major faces to provide an inner face 23B and an outer face 23C which is directed opposite to the inner face 23B. The inner face 23B is facing and is adjacent to the liquid crystal display panel 11. A large number of ridges 23E is arranged on the inner face 23B in order for the inner face 23B to provide an emission promoting face having an emission promoting function.

The ridges 23E are substantially nonparallel with respect to the incidence end face 23A, being inclined at a certain inclination angle α. Inclination angle α is determined according to design, falling preferably within a range from 5 to 45 degrees, in particular, from 15 to 30 degrees.

Such an inclined arrangement and the numerical ranges as above effect this embodiment in the same way as in the case of the first embodiment, and accordingly, a detailed description of them is not repeated here. The ridges 23E employed in the present embodiment function also as they have an effective width that is greater than the actual width. Therefore, if such ridges having a width smaller than the prior art are employed, the effective width can be maintained. Ridges of small-size are hardly conspicuous, and accordingly they prevent illumination quality of the surface light source device 22 and display quality of the liquid crystal display 20 from being deteriorated.

And besides, the ridges 23E orientated obliquely reduce the possibility of Moire fringe appearance which might be caused by ambient periodically arranged components such as transparent electrodes. This also prevents illumination quality or display quality from being deteriorated.

The guide plate 23 (the present embodiment) differs from the guide plate 13 (the first embodiment) in the manner of configuration at and around the ridges 23E, 13E. The ridges 23E and their foot portions are configurated so as to satisfy the following conditions (see FIGS. 7 and 9, in particular).

(1) Every ridge 23E has approximately the same three-dimensional shape.

(2) Each ridge 23E provides an approximately constant cross section area of "cross section parallel with the outer face 23C" overall from its base portion to top portion.

(3) The first flank face 23EA and the second flank face 23EB are steep and approximately vertical to a general plane representing the emission function face (inner face 23B). Each ridge 23E has a top face 23G at the top portion, the top face 23G extending approximately in parallel with the general plane.

(4) The first flank face 23EA is connected with the emission function face (inner face 23B) at the first foot portion 23BA while the second flank face 23EB is connected with the emission function face (inner face 23B) at the second foot portion 23BB. The second foot portion 23BB provides a stepwise difference d with respect to the first foot portion 23BA.

This stepwise difference is formed so that a thickness of the guide plate 23 is greater at the second foot portion 23BB as compared with the first foot portion 23BA. In other words, the first flank face 23EA provides a "higher cliff" in comparison with one provided by the second flank face 23EB. The first foot portion 23BA and the second foot portion 23BB form slopes in the present embodiment, respectively.

On lighting of the fluorescent lamp 15, illumination light L is introduced into the guide plate 23 and then propagates within the guide plate 23 so as to move far from the incidence end face 23A with repeated inside-reflections at the inner and outer faces 23B and 23C.

Through this process, much of illumination light L has the opportunity to enter into any of the ridges 23E. In order that such opportunity increases according to a distance from the incidence end face 23A, the formation interval of the ridges 23E gets smaller according to the distance from the end face 23A. This gives the surface light source device 11 a uniform illumination output distribution.

Figure 8:
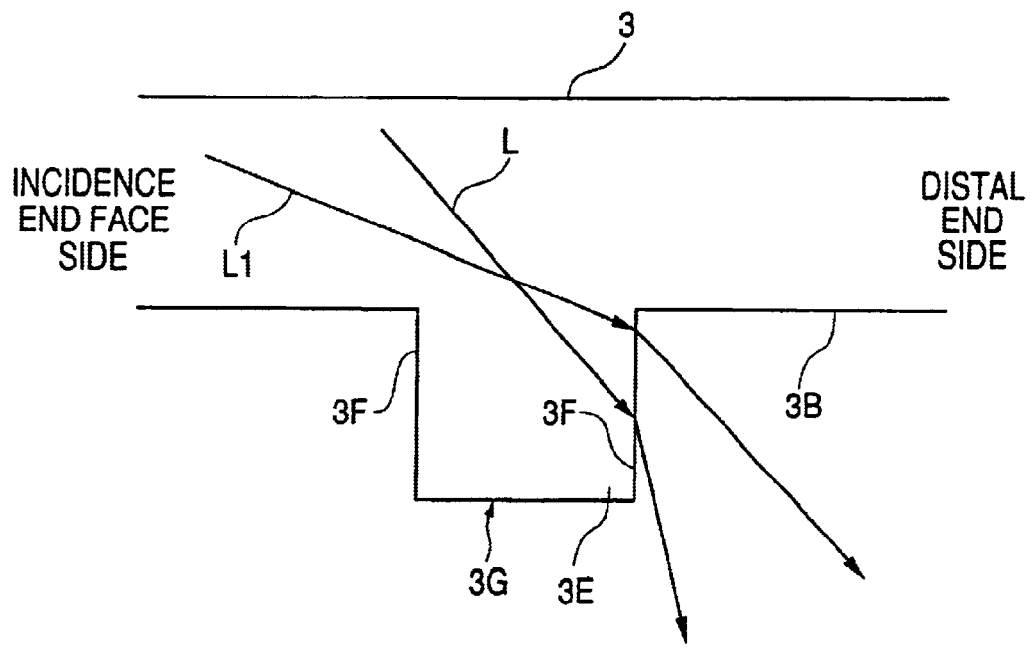
FIG. 8 is a cross section view illustrating light paths of illumination light in a case where ridges accompany no stepwise difference.

In addition to this, inclination provided by the first and second foot portions 23BA, 23BB increases according to a distance from the incidence end face 23A. Referring to FIGS. 8 and 9, effects of the stepwise difference provided by the foot portions 23BA, 23BB are explained as follows.

FIG. 9 shows a case where illumination light L is inside-incident to the second flank face 23EB at an incidence angle that is limited as compared with FIG. 8. That is, the stepwise difference allows less light to be inside-incident to the second flank face 23EB at small inside-incidence angles. As a result, the liquid crystal display panel 11 is supplied with light having directivity such that less light is supplied from greatly oblique directions.

In the case of FIG. 8 provided with no step difference, inside-incidence angle to the vertically steep flank face 3F has a broad distribution roughly within a range 0 degree to θ. Illumination light L which approaches the ridge 3E at a relatively deep angle is directed to the liquid crystal display panel 11 in a roughly frontal direction after being refracted.

However, light also reaches the flank face 3F at inside-incidence angle near to 0 degree as illumination light L1. Such illumination light L1 escapes easily through the flank face 3F. Although this escaping involves some refraction, escaped light is still directed greatly inclined to the frontal direction (i.e., the normal) with respect to the liquid crystal display panel 11.

To the contrary, in the case of FIG. 9, a component which approaches the ridge 23E at a small inside-incidence angle as illumination light L1 is actually inside-incident to the second foot portion 23BB at a relatively large inside-incidence angle without being inside-incident to the second flank face 23EB due to the step difference. Illumination light L which approaches the ridge 23E at a relatively large inside-incidence angle is directed to the frontal direction with respect to the liquid crystal display panel 11.

According to the above mechanism, the case of FIG. 9 provides illumination output which is more directed to the frontal direction than the case of FIG. 8.

And besides, the inclination of the second foot portion 23BB as illustrated causes illumination light L1 to be modified, after undergoing inside-reflection, so that its propagation direction gets near to a direction of thickness of the guide plate 23. As a result, inside-incidence to the flank face 23EB at a relatively large inside-incidence angle tends to occur easily at the next chance of entering into any ridge, after undergoing a succeeding inside-reflection at the outer face 23C. Thus inside-reflection caused by the second foot portion 23BB scarcely impedes emission function.

In general, incidence of light on the flank face 23EB requires that the inside-incidence angle ø is greater than ø0, ø>ø0, where the stepwise difference is d, interval between the flank faces 23EA and 23EB (i.e., width of the ridge 23E) W, and $\tan^{-1}$ (d/W)=ø0. That is, illumination light having inside-incidence angle ø which is not greater than ø0, namely if ø≦ø0, is not permitted to reach thereto.

Stepwise difference d is designed based on the above conditions so that angle ø0 is an appropriate small value such as 5 degrees. As to interval W, it is set at a small value so that the ridge 23E is small enough to be almost invisible. A practical range is from 5 to 50 μm.

<3> Third Embodiment

Figure 10A:
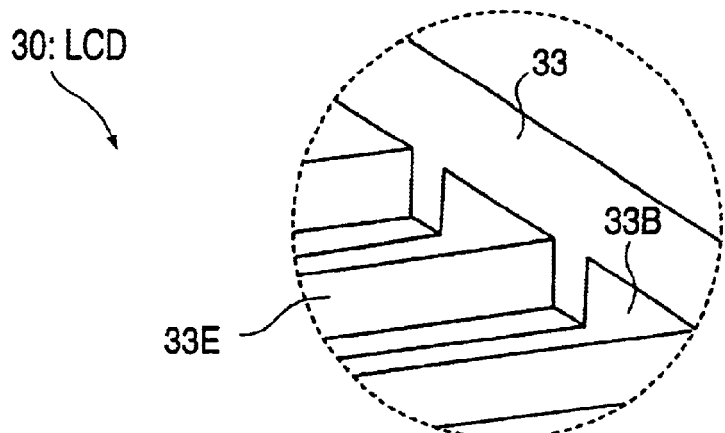
FIG. 10A is an enlarged view of portion I shown in phantom lines in FIG. 10.
Figure 10:
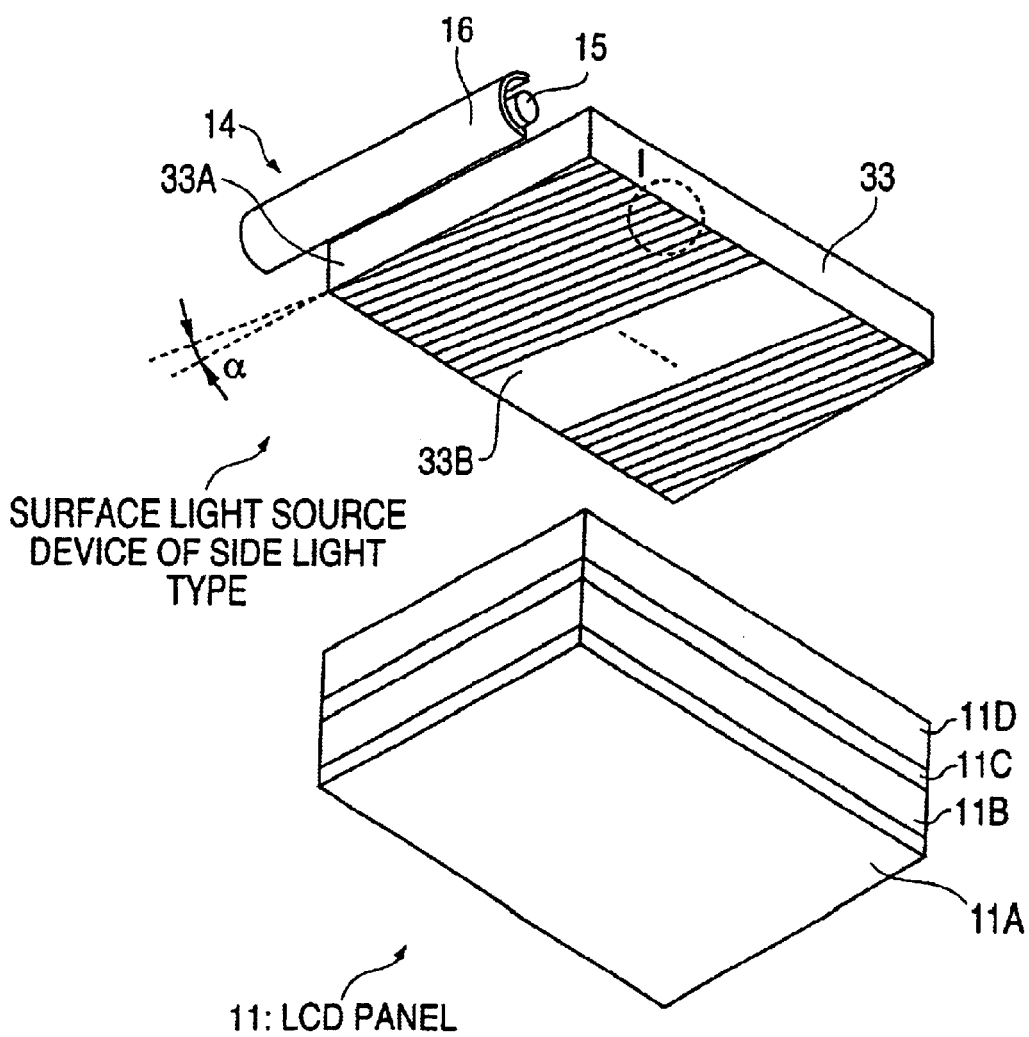
FIG. 10 is an exploded perspective view of a liquid crystal display of a third embodiment in accordance with the present invention.

Referring to FIG. 10, illustrated is a liquid crystal display 30 according to the third embodiment. The liquid crystal display 30 comprises a surface light source device of side light type 32 instead of the surface light source device of side light type 12 or 22. The surface light source device 32 employs a guide plate 33 instead of the guide plate 13 or 23.

Except this, the present embodiment has a skeleton structure the same as that of the aforementioned first or second embodiment. The present embodiment is structured more simply as compared with the aforementioned embodiments. Members common to the first or second embodiment are referenced without repeating the descriptions thereof.

The surface light source device 32 is disposed at the outside (i.e., at the screen side or viewing side) of the liquid crystal display panel 11 for front-lighting of the panel. The liquid crystal display panel 11 is structured and works as described in the description of the first embodiment.

As shown particularly in FIG. 10A, the surface light source device 32 comprises a guide plate 33 and a primary light source 14. The guide plate 33 has an end face to provide an incidence end face 33A through which the guide plate 33 is supplied with illumination light from the primary light source 14. The primary light source 14 may be the same as employed in the first embodiment. Illumination light is directed to the incidence end face 33A through an opening of a reflector 16.

Illumination light is introduced into the guide plate 33 in the form of a beam flux having some angular event. The guide plate 33 may be made of the same material as that of the guide plate 13 employed in the first or second embodiment. Injection molding may be applied for manufacturing.

The guide plate 33 has major faces to provide an inner face 33B and an outer face 33C which is directed oppositely with the inner face 33B. The inner face 33B faces and is adjacent to the liquid crystal display panel 11.

A large number of ridges 33E is arranged on the inner face 33B in order that the inner face 33B provides an emission promoting face having an emission promoting function.

The ridges 33E are substantially nonparallel with respect to the incidence end face 33A, being inclined at a certain inclination angle α. Inclination angle α is determined according to design, falling preferably within a range from 5 to 45 degrees, in particular, from 15 to 30 degrees.

Such an inclined arrangement and the numerical ranges as above effect this embodiment in the same way as in the case of the first embodiment. The ridges 33E employed in the present embodiment function also as they have an effective width that is greater than the actual width. Therefore, if such ridges having a width smaller than the prior art are employed, the effective width can be maintained. Ridges of small size are less conspicuous, and accordingly they prevent illumination quality of the surface light source device 32 and display quality of the liquid crystal display 30 from being deteriorated.

Besides, the ridges 33E orientated obliquely reduce the possibility of Moire fringe appearance which might be caused by ambient periodically arranged components such as transparent electrodes. This also prevents illumination quality or display quality from being deteriorated.

The guide plate 33 has a simplified configuration, being configurated so as to satisfy the following conditions.

(1) Every ridge 33E has approximately the same three-dimensional shape.

(2) Each ridge 33E provides an approximately constant cross section area overall from its base portion to top portion.

(3) Each pair of flank faces is steep and approximately vertical to a general plane representing the emission function face (inner face 33B). Each ridge 33E has a top face at the top portion, the top face extending approximately in parallel with the general plane.

(4) A stepwise difference as employed in the second embodiment is not adopted. In other words, the first and second foot portions are not deviated from the general plane.

Although the present structure is simplified as above, an important feature of the present invention is maintained. That is, as previously described in detail, the ridges 33E have an effective width that is greater than the actual width. This allows ridges having small size that are less conspicuous to be employed. As a result, the surface light source device 32 and liquid crystal display 30 can avoid reduction in illumination quality or display quality.

And besides, the ridges 33E orientated obliquely reduce the possibility of Moire fringe appearance, thereby preventing illumination quality or display quality from being deteriorated.

<4> Forth Embodiment

In the first, second and third embodiments, the emission function faces are provided by LCD-panel-side faces (inner faces). Alternatively, it may be provided by an outer face (opposite with a liquid crystal display panel). An example of this formation is illustrated in FIG. 11 as the forth embodiment. Description of the present embodiment is simplified without repeating explanation.

Referring to FIG. 11, a liquid crystal display 40 comprises a surface light source device of side light type 42 for front-lighting of a liquid crystal display panel 11. The surface light source device 42 employs a guide plate 43. The liquid crystal display panel 11 is structured and works as described previously.

The guide plate 43 may be made of the same material as that of the guide plate 13 or others. Injection molding may be applied for manufacturing. The guide plate 43 has major faces to provide an inner face and an outer face which is directed oppositely with the inner face. The inner face faces and is adjacent to the liquid crystal display panel 11.

According to a feature of the present embodiment, a large number of ridges 43E is arranged on the outer face in order for the outer face to provide an emission promoting face having an emission promoting function. The ridges 43E are substantially nonparallel with respect to an incidence end face, being inclined at a certain inclination angle. This inclination angle falls preferably within a range from 5 to 45 degrees, in particular, from 15 to 30 degrees. Such an inclined arrangement also causes each ridge 43E to function as it has an effective width that is greater than the actual width.

Therefore, if such ridges having a width smaller than the prior art are employed, the effective width can be maintained. Ridges of small-size are less conspicuous, and accordingly they prevent illumination quality of the surface light source device 42 and display quality of the liquid crystal display 40 from being deteriorated.

And besides, as described previously, the possibility of Moire fringe appearance is reduced. This also prevents illumination quality or display quality from being deteriorated.

Each ridge has a pair of flank faces 43EA, 43EB. In the present embodiment, the flank faces 43EA, 43EB provide a slope directed to the incidence end face and another slope opposite with the incidence end face, respectively. The flank faces 43EA and 43EB meet at a top of each ridge to provide a top line. Configuration of each ridge 43E belongs to category of "being tapered".

On lighting of the fluorescent lamp 15, a beam flux represented by illumination light L is introduced into the guide plate 43. Thus introduced illumination light L propagates within the guide plate 43 so as to move far from the incidence end face with repeated inside-reflections at the inner and outer faces.

Through this process, much of the illumination light L gets the opportunity to enter into any of the ridges 43E. As illustrated, a large part of the illumination light L that has entered into a ridge 43E undergoes an inside-reflection at the second flank face (slope) 43EB, then is emitted through the inner face toward the liquid crystal display panel 11. Some of the emitted light transmits above the liquid crystal display panel 11 twice reciprocally, as described previously, then is emitted toward ambiance. As a result, output light of the liquid crystal display panel forms an image.

As for ambient light, it is introduced into the guide plate 43 through the outer face (any slope). Some of the ambient light transmits twice the liquid crystal display panel 11 along a reciprocal path similar to that of illumination light L, then being emitted toward ambiance. Output light of the liquid crystal display panel causes image formation.

<5> Modifications

The above-described first through fourth embodiments are not limitative to the present invention at all. Modifications such as follows fall within the scope of the present invention.

(a) In the first embodiment, each ridge is formed so that conditions of "being tapered (gradually reducing cross section)" and "inclined projection (first and second flank faces inclined opposite to an incidence end face)" are satisfied. However, each ridge may be formed so that only one of the conditions is satisfied.

It is noted that the second embodiment is out of these two conditions, employing ridges, each of which satisfies conditions of "constant cross section" and "vertical projection".

In another employable case, each ridge is tapered (with gradually reducing cross section) and vertically projecting as a whole. However, if this case is employed, it is preferable that both of the first and second flank faces are inclined opposite to an incidence end face.

Alternatively, one of the first and second flank faces may be inclined to a general plane representing an emission function face, with the other being vertical to the general plane. For example, in a case where ridges are formed in a process after molding, manufacturing is easily performed under a condition such that "the first flank face is vertical" and "the second flank face is inclined".

(b) In the second embodiment, the inner face is fully inclined between ridges adjacent to each other in order to provide a stepwise difference between the first foot portion 23BA and the second flank face 23EB. Instead of this, a partial inclination may provide a stepwise difference.

(c) Although the above embodiments employ guide plates, each of which has a uniform thickness, a guide plate having a wedge-like cross section may be employed instead.

(d) The above embodiments employ guide plates, each of which is supplied with light through only one incidence end face. However this puts no limitation onto the present invention. For instance, two side end faces opposite each other may provide two incidence end faces.

(e) The surface light source devices in the above embodiments employ rod-like primary light sources (fluorescent lamps) to supply primary light. Alternatively employable primary light sources comprise an arrangement provided with a plurality of point-like light sources such as light emitting diodes.

(f) In each of the above embodiments, a major face opposite with an emission function face (the outer faces in the first through third embodiments; and the inner face in the forth embodiment) is a flat face. However, instead of such a flat face, a processed face my be, employed. For example, ant-reflection coating may be applied. Alternatively, non-glare processing such as mat-processing may be applied.

(g) In each of the above embodiments, an incidence end face is vertical to a major face (outer face or inner face). However this puts no limitation onto the present invention. That is, an incidence end face may be inclined to a major face (outer face or inner face).

(h) In the above embodiments, the present invention is applied to surface light source devices for liquid crystal displays. However this puts no limitation onto the present invention. That is, the present invention may be broadly applied to surface light source devices of side light type for various illumination devices and displays, and to guide plates employed therein.

What is claimed is:

1. A guide plate comprising:
   an incidence end face to introduce illumination light; and
   an emission function face provided to emit the illumination light,
   wherein said emission function face is provided with a number of ridges, each of which has a first flank face directed to the incidence end face, a second flank face opposite to the first flank face and a flat top face, and
   wherein each of said ridges runs so as to traverse obliquely the emission function face in a direction which is inclined at an angle falling within a predetermined angle range with respect to the incidence end face, said ridges being arranged disconnectedly at intervals.

2. A guide plate as defined in claim 1, wherein said angle range is from 5 degrees to 45 degrees.

3. A guide plate as defined in claim 1 or 2, wherein at least said second flank face is inclined so as to increase in distance from the incidence end face.

4. A guide plate as defined in claim 3, wherein both of said first and second flank faces are inclined so as to increase in distance from the incidence end face.

5. A guide plate as defined in claim 1 or 2, wherein each of said ridges has a decreasing cross section so as to be tapered toward a ridge top portion.

6. A guide plate as defined in claim 3, wherein each of said ridges has a decreasing cross section so as to be tapered toward a ridge top portion.

7. A guide plate as defined in claim 4, wherein each of said ridges has a decreasing cross section so as to be tapered toward a ridge top portion.

8. A guide plate as defined in claim 1 or 2, wherein said emission function face includes a first foot portion connecting with the first flank face and a second foot portion connecting with the second flank face, said second foot portion provides a stepwise difference such that a thickness of the guide plate is greater at the second foot portion than at the first foot portion.

9. A guide plate as defined in claim 3, wherein said emission function face includes a first foot portion connecting with the first flank face and a second foot portion connecting with the second flank face, said second foot portion provides a stepwise difference such that a thickness of the guide plate is greater at the second foot portion than at the first foot portion.

10. A guide plate as defined in claim 5, wherein said emission function face includes a first foot portion connecting with the first flank face and a second foot portion connecting with the second flank face, said second foot portion provides a stepwise difference such that a thickness of the guide plate is greater at the second foot portion than at the first foot portion.

11. A surface light source device of side light type comprising:
    a guide plate which has an incidence end face to introduce illumination light and an emission function face provided to emit the illumination light; and
    a primary light source disposed beside the guide plate to supply illumination light,
    wherein said emission function face is provided with a number of ridges, each of which has a first flank face directed to the incidence end face, a second flank face opposite to the first flank face and a flat top face, and
    wherein each of said ridges runs so as to traverse obliquely the emission function face in a direction which is inclined at an angle falling within a predetermined angle range with respect to the incidence end face, said ridges being arranged disconnectedly at intervals.

12. A surface light source device as defined in claim 11, wherein said angle range is from 5 degrees to 45 degrees.

13. A surface light source device as defined in claim 11 or 12, wherein at least said second flank face is inclined so as to increase in distance from the incidence end face.

14. A surface light source device as defined in claim 13, wherein both of said first and second flank faces are inclined so as to increase in distance from the incidence end face.

15. A surface light source device as defined in claim 11 or 12, wherein each of said ridges has a decreasing cross section so as to be tapered toward a ridge top portion.

16. A surface light source device as defined in claim 13, wherein each of said ridges has a decreasing cross section so as to be tapered toward a ridge top portion.

17. A surface light source device as defined in claim 14, wherein each of said ridges has a decreasing cross section so as to be tapered toward a ridge top portion.

18. A surface light source device as defined in claim 11 or 12, wherein said emission function face includes a first foot portion connecting with the first flank face and a second foot portion connecting with the second flank face, said second foot portion provides a stepwise difference such that a thickness of the guide plate is greater at the second foot portion than at the first foot portion.

19. A surface light source device as defined in claim 13, wherein said emission function face includes a first foot portion connecting with the first flank face and a second foot portion connecting with the second flank face, said second foot portion provides a stepwise difference such that a thickness of the guide plate is greater at the second foot portion than at the first foot portion.

20. A surface light source device as defined in claim 15, wherein said emission function face includes a first foot portion connecting with the first flank face and a second foot portion connecting with the second flank face, said second foot portion provides a stepwise difference such that a thickness of the guide plate is greater at the second foot portion than at the first foot portion.

21. A liquid crystal display comprising:
    a surface light source device of side light type which has a guide plate having an incidence end face to introduce illumination light and an emission function face provided to emit the illumination light and which has a primary light source disposed beside the guide plate to supply illumination light; and
    a liquid crystal display panel to be illuminated by the surface light source device,
    wherein said emission function face is provided with a number of ridges, each of which has a first flank face directed to the incidence end face, a second flank face opposite to the first flank face and a flat top face, and
    wherein each of said ridges runs so as to traverse obliquely the emission function face in a direction which is inclined at an angle falling within a predetermined angle range with respect to the incidence end face, said ridges being arranged disconnectedly at intervals.

22. A liquid crystal display as defined in claim 21, wherein said angle range is from 5 degrees to 45 degrees.

23. A liquid crystal display as defined in claim 21 or 22, wherein at least said second flank face is inclined so as to increase in distance from the incidence end face.

24. A liquid crystal display as defined in claim 23, wherein both of said first and second flank faces are inclined so as to increase in distance from the incidence end face.

25. A liquid crystal display as defined in claim 21 or 22, wherein each of said ridges has a decreasing cross section so as to be tapered toward a ridge top portion.

26. A liquid crystal display as defined in claim 23, wherein each of said ridges has a decreasing cross section so as to be tapered toward a ridge top portion.

27. A liquid crystal display as defined in claim 24, wherein each of said ridges has a decreasing cross section so as to be tapered toward a ridge top portion.

28. A liquid crystal display as defined in claim 21 or 22, wherein said emission function face includes a first foot portion connecting with the first flank face and a second foot portion connecting with the second flank face, said second foot portion provides a stepwise difference such that a thickness of the guide plate is greater at the second foot portion than at the first foot portion.

29. A liquid crystal display as defined in claim 23, wherein said emission function face includes a first foot portion connecting with the first flank face and a second foot portion connecting with the second flank face, said second foot portion provides a stepwise difference such that a thickness of the guide plate is greater at the second foot portion than at the first foot portion.

30. A liquid crystal display as defined in claim 25, wherein said emission function face includes a first foot portion connecting with the first flank face and a second foot portion connecting with the second flank face, said second foot portion provides a stepwise difference such that a thickness of the guide plate is greater at the second foot portion than at the first foot portion.

31. A liquid crystal display as defined in claim 21 or 22, wherein said surface light source device of side light type is arranged for front-lighting of said liquid crystal display panel.

32. A liquid crystal display as defined in claim 23, wherein said surface light source device of side light type is arranged for front-lighting of said liquid crystal display panel.

33. A liquid crystal display as defined in claim 25, wherein said surface light source device of side light type is arranged for front-lighting of said liquid crystal display panel.

34. A liquid crystal display as defined in claim 28, wherein said surface light source device of side light type is arranged for front-lighting of said liquid crystal display panel.

* * * * *